United States Patent
Terada et al.

(10) Patent No.: US 7,596,624 B2
(45) Date of Patent: Sep. 29, 2009

(54) DATA STREAM SELECTION/OUTPUT APPARATUS AND CONTROL PROGRAM FOR ACHIEVING THE APPARATUS

(75) Inventors: Yoshihisa Terada, Kadoma (JP); Toshiya Mori, Settsu (JP); Koichiro Yamaguchi, Ashiya (JP); Hideki Kagemoto, Nara (JP); Akihiro Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 644 days.

(21) Appl. No.: 10/278,118

(22) Filed: Oct. 21, 2002

(65) Prior Publication Data

US 2003/0079036 A1    Apr. 24, 2003

(30) Foreign Application Priority Data

Oct. 22, 2001 (JP) ............................. 2001-323711
Jun. 10, 2002 (JP) ............................. 2002-169069

(51) Int. Cl.
*G06F 15/16* (2006.01)

(52) U.S. Cl. .................................... 709/231

(58) Field of Classification Search ................ 725/117, 725/148; 709/231
See application file for complete search history.

(56) References Cited

U.S. PATENT DOCUMENTS

| | | | |
|---|---|---|---|
| 5,859,660 A * | 1/1999 | Perkins et al. | 725/32 |
| 5,917,830 A * | 6/1999 | Chen et al. | 370/487 |
| 6,038,000 A * | 3/2000 | Hurst, Jr. | 375/240.26 |
| 6,072,771 A * | 6/2000 | Anderson et al. | 370/216 |
| 6,137,834 A * | 10/2000 | Wine et al. | 375/240 |
| 6,573,942 B1 * | 6/2003 | Crinon | 348/518 |
| 6,751,221 B1 * | 6/2004 | Saito et al. | 370/392 |
| 6,963,590 B1 * | 11/2005 | Mann et al. | 370/535 |
| 6,988,238 B1 * | 1/2006 | Kovacevic et al. | 714/799 |
| 7,313,315 B2 * | 12/2007 | Morris et al. | 386/95 |
| 2002/0023270 A1* | 2/2002 | Thomas et al. | 725/95 |
| 2002/0154694 A1* | 10/2002 | Birch | 375/240.05 |

FOREIGN PATENT DOCUMENTS

| | | |
|---|---|---|
| JP | 11-262002 | 9/1999 |
| JP | 2001-516995 | 10/2001 |
| JP | 2001-517040 | 10/2001 |
| WO | WO 99/14955 | 3/1999 |

* cited by examiner

*Primary Examiner*—Andrew Caldwell
*Assistant Examiner*—Grant Ford

(57) ABSTRACT

A data stream selection/output apparatus that selects and outputs a data stream composed of sequentially obtained data. The data stream selection/output apparatus obtains timing information indicating a time at which a first data stream being output should be switched to a second data stream. The data stream selection/output apparatus, in a time period including the time indicated by the timing information, scans the first and second data streams to detect a first boundary between data blocks of the first data stream and a second boundary between data blocks of the second data stream, where the data blocks conform to a transmission protocol higher than Transport Layer of OSI Reference Model. The data stream selection/output apparatus then stops outputting the first data stream at the first block boundary and starts outputting the second data stream at the second block boundary.

31 Claims, 9 Drawing Sheets

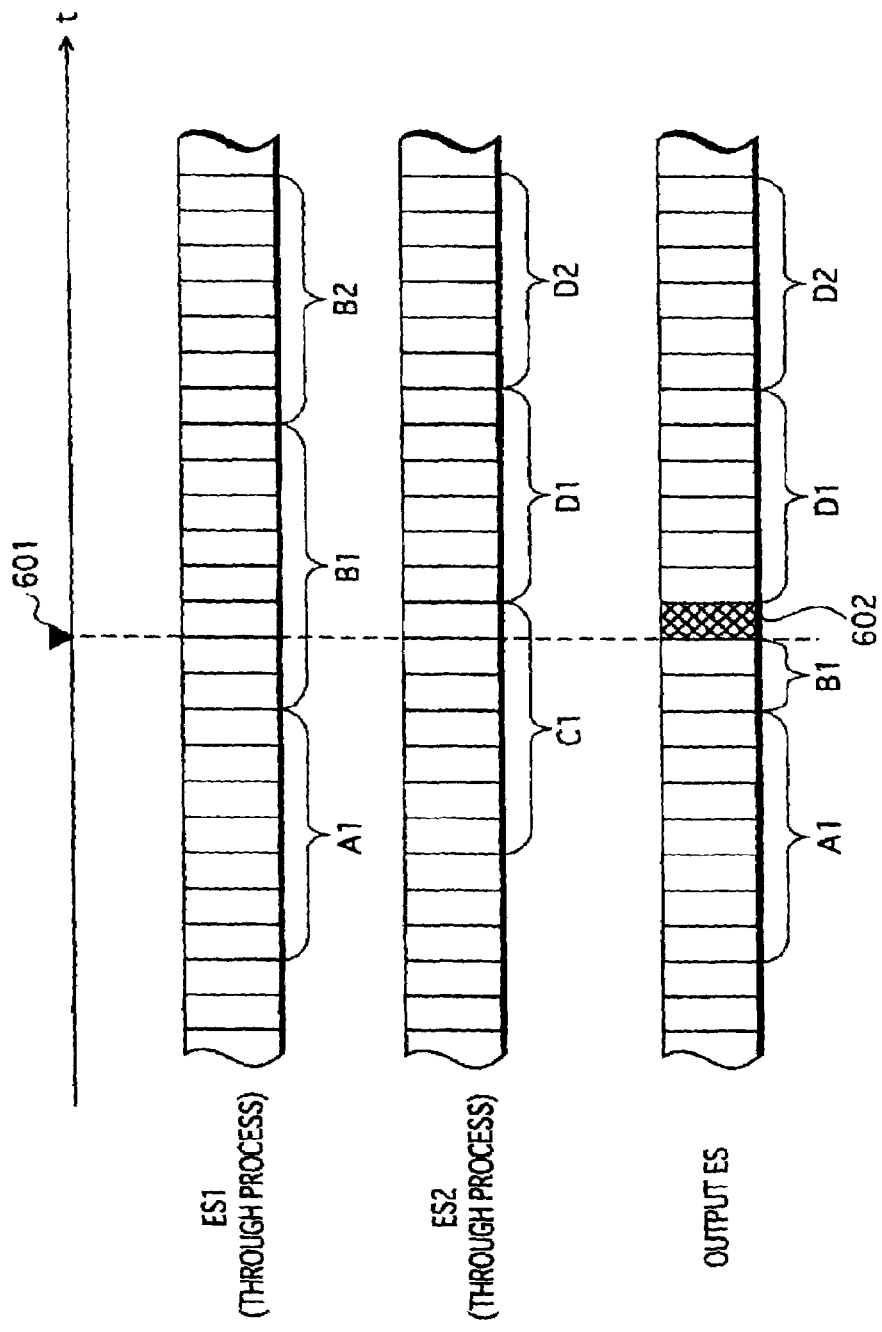

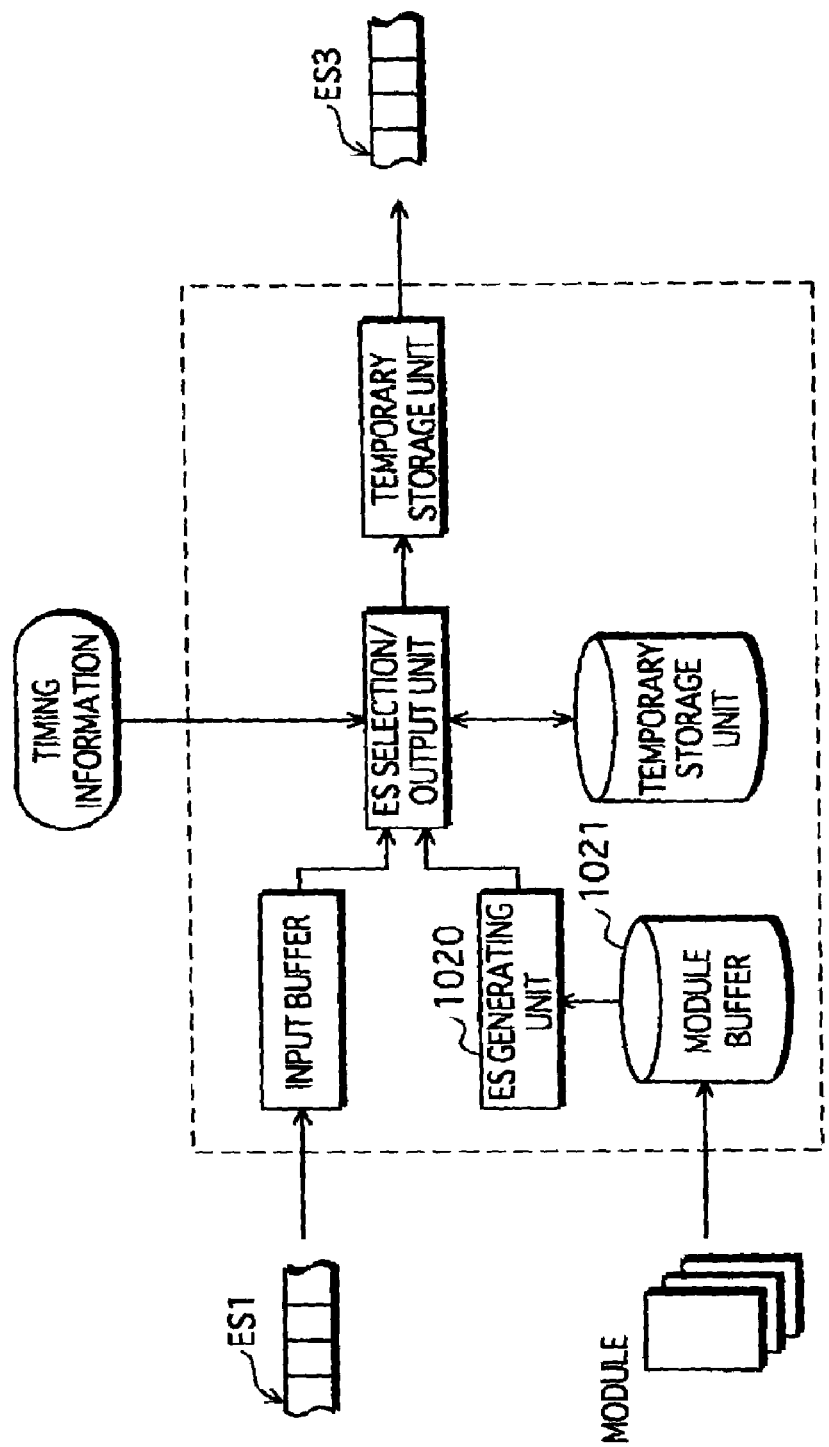

DATA STREAM SELECTION/OUTPUT APPARATUS AND CONTROL PROGRAM FOR ACHIEVING THE APPARATUS

BACKGROUND OF THE INVENTION (1) Field of the Invention

The present invention relates to a data stream selection/output apparatus that selects a data stream out of a plurality of data streams each of which is composed of sequentially obtained data and outputs the selected data stream.

(2) Description of the Related Art

In the terrestrial television broadcasting, a program distribution system has been established. In the system, a key station distributes TV programs to a plurality of local stations, and each local station broadcasts the distributed broadcast programs according to their broadcasting schedules as well as other self-made broadcast programs and commercials. In the broadcasting, the local stations use a device called switcher. The switcher is a data stream selection/output apparatus that stops outputting a data stream of moving pictures, voices or the like and starts outputting another data stream, based on a broadcasting schedule.

Meanwhile, when a switcher selects and outputs a compressed data stream (for example, a transport stream (abbreviated as TS) conforming to the MPEG2-TS (Moving Picture Experts Group 2-Transport Stream) defined in the ISO/IEC13818), there are some matters to be taken care.

For example, when a switcher selects and outputs an elementary stream (abbreviated as ES) containing compressed image data conforming to MPEG2, a care should be taken so as not to partition the units of GOPs (Group Of Pictures). This is because such incomplete GOPs would cause a failure in the bidirectional prediction which is performed when compressed image data is decompressed. This causes irregularity in the reproduced and displayed images.

Japanese Laid-Open Patent Application No. 2001-517040, aiming to solve the above-described problem, discloses a technique in which a plurality of compressed programs are spliced together to be seamless.

The above-introduced document, however, does not disclose or suggest a matter to be dealt with when a switcher selects and outputs an elementary stream in the data broadcasting. Note that the data broadcasting is a form of digital broadcasting in which, for example, elementary streams conforming to the DSM-CC (Digital Storage Media Command and Control) protocol defined in the ISO/IEC13818-6 are broadcast. The DSM-CC protocol extends over Session Layer and Application Layer which are higher than Transport Layer in the OSI Reference Model. An elementary stream conforming to the DSM-CC protocol is composed of variable-length data blocks that are repeatedly transmitted in cycles, each data block no larger than 4 KB.

Here, if a conventional switcher, which supports only Transport Layer in the OSI Reference Model, is used to select and output an elementary stream for the data broadcasting, the broadcast elementary stream may include an incomplete section since it may partition the elementary stream in the middle of a section. If an elementary stream including such an incomplete section is broadcast, a receiving apparatus of the broadcast would recognize an MPEG standard violation and discard the section since a CRC value attached to the end of the section does not match a result of the calculation performed for the Cyclic Redundancy Checking.

SUMMARY OF THE INVENTION

It is therefore an object of the present invention to provide a data stream selection/output apparatus that prevents occurrence of MPEG standard violation when selecting and outputting an elementary stream for the data broadcasting.

The above object is fulfilled by a data stream selection/output apparatus that selects a data stream out of a plurality of data streams each of which is composed of sequentially obtained data, and outputs the selected data stream, the data stream selection/output apparatus comprising: a timing information obtaining unit operable to obtain timing information that indicates a time at which a first data stream being output is switched to a second data stream; a detecting unit operable to, in a time period including the time indicated by the timing information, scan the first data stream and the second data stream and detect a first boundary between data blocks of the first data stream and a second boundary between data blocks of the second data stream, where the data blocks conform to a transmission protocol that is higher than Transport Layer of OSI Reference Model; and a selection/output unit operable to stop outputting the first data stream at the detected first block boundary and start outputting the second data stream at the detected second block boundary.

With the above-stated construction, the data stream selection/output apparatus selects and outputs a data stream at a data block boundary conforming to a transmission protocol (for example, a section boundary conforming to the DSM-CC protocol) higher than Transport Layer of the OSI Reference Model. This prevents occurrence of MPEG standard violation that may occur when the data stream is partitioned at a block boundary in conformity with Transport Layer of the OSI Reference Model. As a result of this, a data stream that may be recognized as an MPEG standard violation is not output.

In the above data stream selection/output apparatus, the first and second data streams may be data streams generated in conformity with DSM-CC protocols, and the data blocks are sections defined in the DSM-CC protocols.

With the above-stated construction in which the data stream selection/output apparatus selects and outputs a data stream at a section boundary conforming to the DSM-CC protocol, a data stream that may be recognized as an MPEG standard violation is not output.

In the above data stream selection/output apparatus, each of the first and second data streams may contain a plurality of broadcast programs, the detecting unit detects, in the time period including the time indicated by the timing information, a boundary between broadcast programs contained in the second data stream, and the selection/output unit stops outputting the first data stream at the first block boundary as a section boundary and starts outputting the second data stream at the broadcast program boundary.

With the above-stated construction, a data stream that may be recognized as an MPEG standard violation is not output, and the second data stream is output from the start of a broadcast program.

In the above data stream selection/output apparatus, the detecting unit, in the time period including the time indicated by the timing information, may scan the first data stream and detect a boundary between broadcast programs contained in the first data stream, and the selection/output unit stops outputting the first data stream at the broadcast program boundary of the first data stream and starts outputting the second data stream at the broadcast program boundary of the second data stream.

With the above-stated construction, a data stream that may be recognized as an MPEG standard violation is not output, the first data stream stops being output with the end of a broadcast program, and the second data stream is output from the start of a broadcast program.

In the above data stream selection/output apparatus, the detecting unit may read a section length written in each section constituting the data streams, and detect a section boundary by referring to the read section length.

With the above-stated construction, section boundaries are detected.

In the above data stream selection/output apparatus, the data streams may be transport streams, and the detecting unit reads "payload_unit_start_indicator" having either a value "0" or a value "1" from each transport stream packet constituting the transport streams, detects a transport stream packet containing "payload_unit_start_indicator" having the value "1", and recognizes the detected transport stream packet as the section boundary.

With the above-stated construction, section boundaries are detected.

In the above data stream selection/output apparatus, the detecting unit may read, in sequence for each data stream, data event identifiers which are written in, on a one-to-one basis, each section constituting the data stream, and if the detecting unit detects a data event identifier that is different from a preceding data event identifier, the detecting unit recognizes a boundary between sections that respectively contain the two data event identifiers, as a broadcast program boundary.

With the above-stated construction, broadcast program boundaries are detected.

The above data stream selection/output apparatus may further comprise a rewriting unit for judging whether the same data event identifier is written in a section of the first data stream and a section of the second data stream, and if the judgment is positive, the rewriting unit rewrites the data event identifier in the section of the second data stream to another code.

With the above-stated construction, in the data streams output from the data stream selection/output apparatus of the present invention, it does not happen that sections making up different broadcast programs have the same data event identifier.

In the above data stream selection/output apparatus, the detecting unit may read, in sequence, version numbers that are written in, on a one-to-one basis, sections constituting the second data stream, and if the detecting unit detects a version number that is different from a preceding version number, the detecting unit recognizes that the detected version number has been updated, and if the detecting unit detects the updated version number, the selection/output unit stops outputting the first data stream at the section boundary and starts outputting the second data stream starting with a section that contains the updated version number.

With the above-stated construction, the second data stream is out put starting with a section indicating an update of version.

In the above data stream selection/output apparatus, the timing information may be obtained from Event Information Table contained in each data stream.

With the above-stated construction, the data stream selection/output apparatus of the present invention obtains the timing information from EIT.

The above data stream selection/output apparatus may further comprise a data stream generating unit for generating data streams each of which is composed of a plurality of sections.

With the above-stated construction, the data stream selection/output apparatus of the present invention can select and output data streams generated by the generating unit of the data stream selection/output apparatus, as well as data streams obtained from outside.

The above object is also fulfilled by a data stream selection/output apparatus that selects a data stream out of a plurality of data streams each of which is composed of sequentially obtained data, and outputs the selected data stream, the data stream selection/output apparatus comprising: a timing information obtaining unit operable to obtain timing information that indicates a time at which a first transport stream being output is switched to a second transport stream; and a selection/output unit operable to stop outputting the first transport stream at the time indicated by the timing information, then outputting a transport stream packet containing a discontinuity indicator set to "1", and then starting outputting the second data stream.

With the above-stated construction, where the transport stream packet containing a discontinuity indicator set to "1" indicates the discontinuity between data before and after the transport stream packet, a receiving apparatus does not detect an MPEG standard violation if it receives an elementary stream having an incomplete section from the data stream selection/output apparatus of the present invention since the discontinuity indicator is attached to the incomplete section.

The above data stream selection/output apparatus may further comprise a detecting unit operable to, in a time period including the time, scan the second data stream and detect a boundary between broadcast programs contained in the second data stream, wherein the selection/output unit stops outputting the first transport stream at the time indicated by the timing information, outputs the transport stream packet containing the discontinuity indicator set to "1", and starts outputting the second data stream at the detected broadcast program boundary.

With the above-stated construction, a data stream that may be recognized as an MPEG standard violation is not output, and the second data stream is output from the start of a broadcast program.

The above data stream selection/output apparatus may further comprise a rewriting unit operable to rewrite a discontinuity indicator in a transport stream packet, which is to be an output start position of the second transport stream, to "1", wherein the selection/output unit stops outputting the first transport stream at the time indicated by the timing information, and starts outputting the second data stream starting with the transport stream packet containing the discontinuity indicator rewritten by the rewriting unit.

With the above-stated construction, the first data stream stops being output at the time indicated by the timing information, and the second data stream is output starting with a transport stream packet containing a discontinuity indicator set to "1".

The above object is also fulfilled by a control program that causes an apparatus with a CPU to perform a data stream selection/output process in which a data stream is selected out of a plurality of data streams each of which is composed of sequentially obtained data, and the selected data stream is output, the data stream selection/output process comprising: a timing information obtaining step for obtaining timing information that indicates a time at which a first data stream being output is switched to a second data stream; a detecting step for, in a time period including the time indicated by the timing information, scanning the first data stream and the second data stream and detecting a first boundary between data blocks of the first data stream and a second boundary between data blocks of the second data stream, where the data blocks conform to a transmission protocol that is higher than Transport Layer of OSI Reference Model; and a selection/output step for stopping outputting the first data stream at the detected first block boundary and starting outputting the second data stream at the detected second block boundary.

With the above-stated construction, a device that performs the data stream selection/output process by executing the above control program recorded on the recording medium of the present invention selects and outputs a data stream at a data block boundary conforming to a transmission protocol (for example, at a section boundary conforming to the DSM-CC protocol) higher than Transport Layer of 0SI Reference Model. This prevents occurrence of MPEG standard violation that may occur when the data stream is partitioned at a block boundary in conformity with Transport Layer of the OSI Reference Model. As a result of this, a data stream that maybe recognized as an MPEG standard violation is not output.

The above object is also fulfilled by a control program that causes an apparatus with a CPU to perform a data stream selection/output process in which a data stream is selected out of a plurality of data streams each of which is composed of sequentially obtained data, and the selected data stream is output, the data stream selection/output process comprising: a timing information obtaining step for obtaining timing information that indicates a time at which a first transport stream being output is switched to a second transport stream; and a selection/output step for stopping outputting the first transport stream at the time indicated by the timing information, then outputting a transport stream packet containing a discontinuity indicator set to "1", and then starting outputting the second data stream.

With the above-stated construction, where the transport stream packet containing a discontinuity indicator set to "1" indicates the discontinuity between data before and after the transport stream packet, a receiving apparatus does not detect an MPEG standard violation if it receives an elementary stream having an incomplete section from a device that performs the data stream selection/output process by executing the above control program of the present invention since the discontinuity indicator is attached to the incomplete section.

The above object is also fulfilled by a computer-readable recording medium in which a control program is recorded, the control program causing an apparatus with a CPU to perform a data stream selection/output process in which a data stream is selected out of a plurality of data streams each of which is composed of sequentially obtained data, and the selected data stream is output, the data stream selection/output process comprising: a timing information obtaining step for obtaining timing information that indicates a time at which a first data stream being output is switched to a second data stream; a detecting step for, in a time period including the time indicated by the timing information, scanning the first data stream and the second data stream and detecting a first boundary between data blocks of the first data stream and a second boundary between data blocks of the second data stream, where the data blocks conform to a transmission protocol that is higher than Transport Layer of OSI Reference Model; and a selection/output step for stopping outputting the first data stream at the detected first block boundary and starting outputting the second data stream at the detected second block boundary.

With the above-stated construction, a device that performs the data stream selection/output process by executing the above control program recorded on the recording medium of the present invention selects and outputs a data stream at a data block boundary conforming to a transmission protocol (for example, at a section boundary conforming to the DSM-CC protocol) higher than Transport Layer of OSI Reference Model. This prevents occurrence of MPEG standard violation that may occur when the data stream is partitioned at a block boundary in conformity with Transport Layer of the OSI Reference Model. As a result of this, a data stream that may be recognized as an MPEG standard violation is not output.

The above object is also fulfilled by a computer-readable recording medium in which a control program is recorded, the control program causing an apparatus with a CPU to perform a data stream selection/output process in which a data stream is selected out of a plurality of data streams each of which is composed of sequentially obtained data, and the selected data stream is output, the data stream selection/output process comprising: a timing information obtaining step for obtaining timing information that indicates a time at which a first transport stream being output is switched to a second transport stream; and a selection/output step for stopping outputting the first transport stream at the time indicated by the timing information, then outputting a transport stream packet containing a discontinuity indicator set to "1", and then starting outputting the second data stream.

With the above-stated construction, where the transport stream packet containing a discontinuity indicator set to "1" indicates the discontinuity between data before and after the transport stream packet, a receiving apparatus does not detect an MPEG standard violation if it receives an elementary stream having an incomplete section from a device that performs the data stream selection/output process by executing the above control program recorded on the recording medium of the present invention since the discontinuity indicator is attached to the incomplete section.

The above object is also fulfilled by a data stream selection/output method that selects a data stream out of a plurality of data streams each of which is composed of sequentially obtained data, and outputs the selected data stream, the data stream selection/output method comprising: a timing information obtaining step for obtaining timing information that indicates a time at which a first data stream being output is switched to a second data stream; a detecting step for, in a time period including the time indicated by the timing information, scanning the first data stream and the second data stream and detecting a first boundary between data blocks of the first data stream and a second boundary between data blocks of the second data stream, where the data blocks conform to a transmission protocol that is higher than Transport Layer of OSI Reference Model; and a selection/output step for stopping outputting the first data stream at the first block boundary and starting outputting the second data stream at the second block boundary.

With the above-stated construction, the above data stream selection/output method of the present invention selects and outputs a data stream at a data block boundary conforming to a transmission protocol (for example, at a section boundary conforming to the DSM-CC protocol) higher than Transport Layer of OSI Reference Model. This prevents occurrence of MPEG standard violation that may occur when the data stream is partitioned at a block boundary in conformity with Transport Layer of the OST Reference Model. As a result of this, a data stream that may be recognized as an MPEG standard violation is not output.

The above object is also fulfilled by a data stream selection/output method that selects a data stream out of a plurality of data streams each of which is composed of sequentially obtained data, and outputs the selected data stream, the data stream selection/output method comprising: a timing information obtaining step for obtaining timing information that indicates a time at which a first transport stream being output is switched to a second transport stream; and a selection/output step for stopping outputting the first transport stream at the time indicated by the timing information, then outputting a transport stream packet containing a discontinuity indicator set to "1", and then starting outputting the second data stream.

With the above-stated construction, where the transport stream packet containing a discontinuity indicator set to "1" indicates the discontinuity between data before and after the transport stream packet, a receiving apparatus does not detect an MPEG standard violation if it receives an elementary stream having an incomplete section since the discontinuity indicator is attached to the incomplete section.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 8 is a time chart showing how an elementary stream to be output is switched to another; and FIG. 9 shows the construction of a data stream selection/output apparatus of the present invention.

DESCRIPTION OF THE PREFERRED EMBODIMENT

The following describes a data stream selection/output apparatus of the present invention through specific embodiments thereof with reference to the attached drawings. It should be noted here that in the following description of the embodiments, the data streams processed by the data stream selection/output apparatus are elementary streams generated as data broadcasting contents by the DSM-CC protocol defined in ISO/IEC 13818-6.

Embodiment 1

Construction

Figure 1:
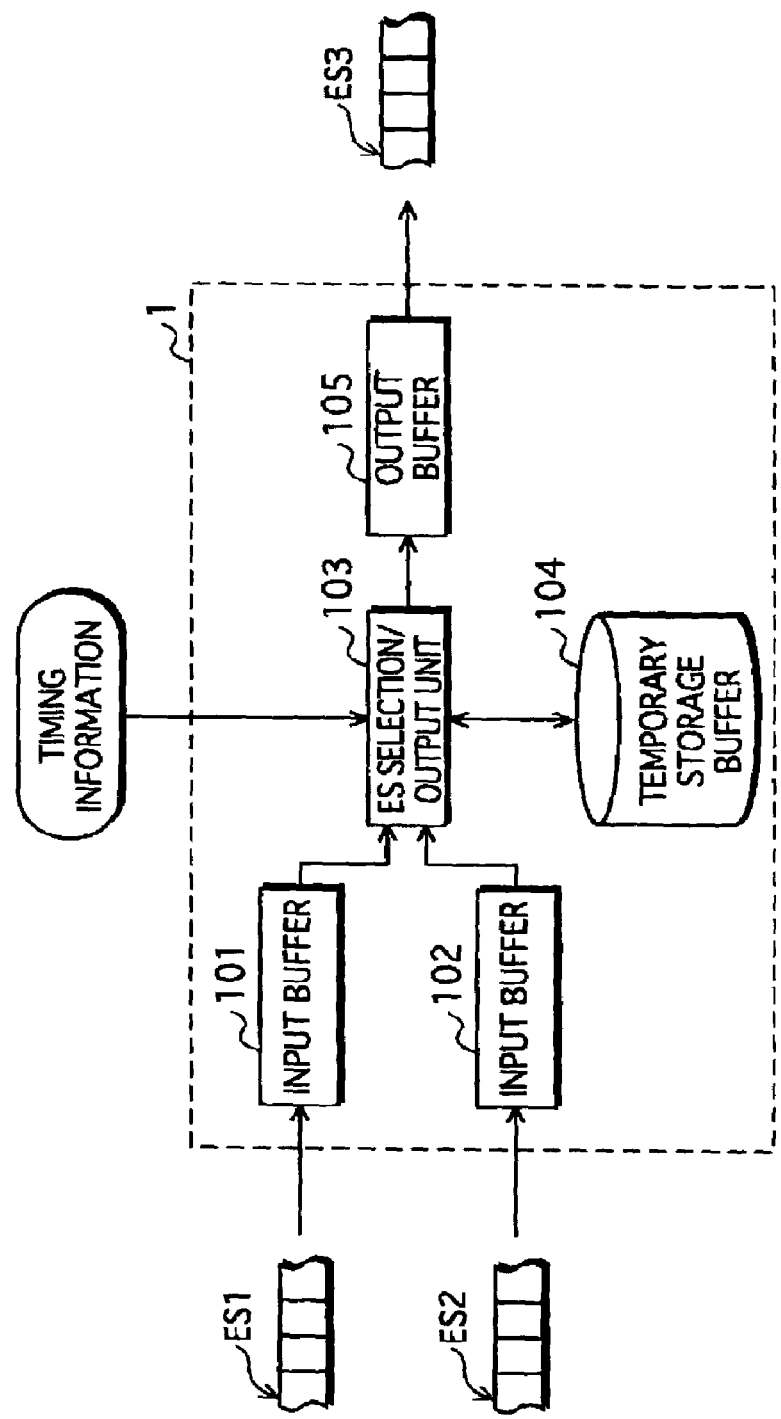
FIG. 1 shows the construction of a data stream selection/output apparatus of the present invention.

FIG. 1 shows the construction of a data stream selection/output apparatus.

As shown in FIG. 1, a data stream selection/output apparatus 1 includes an input buffer 101, an input buffer 102, an elementary stream (abbreviated as ES) selection/output unit 103, a temporary storage buffer 104, and an output buffer 105. Although not illustrated, hardware such as a CPU, a memory, and a hard disk is also used.

Each function of the data stream selection/output apparatus 1 is achieved when the CPU executes a program stored in the memory or the hard disk.

Each of the input buffers 101 and 102 stores elementary streams in sequence in the order it receives from outside. The stored elementary streams are output to the ES selection/output unit 103 in sequence on the FIFO (First-In First Out) basis. It is noted here that the "outside" indicates, for example, a device that receives a transport stream generated by the key station and distributes various types of elementary streams extracted from the transport stream, or an authoring apparatus that generates elementary streams as data broadcasting contents.

The ES selection/output unit 103 (i) receives, from outside, timing information that indicates a time when the selection/output is to be done, (ii) scans, in a time period including the time indicated by the timing information, two elementary streams one of which is currently output and the other is to be newly output (hereinafter referred to as stop ES and start ES, respectively), (iii) detects a boundary between broadcast programs or sections for each of the stop ES and start ES, and (iv) stops outputting the stop ES at the detected boundary of the stop ES and starts outputting the start ES at the detected boundary of the start ES. The boundaries will be described in detail later.

The ES selection/output unit 103 receives two elementary streams from the input buffers 101 and 102, selects one out of the two elementary streams, and outputs the selected elementary stream to the output buffer 105. In doing this, each elementary stream maybe treated by either the buffer processor the "through" process. In the buffer process, the ES selection/output unit 103 temporarily stores the elementary stream in the temporary storage buffer 104, then outputs the elementary stream to the output buffer 105. In the buffer process, the ES selection/output unit 103 may convert the bit rate of the elementary stream by the bit rate conversion method disclosed in Japanese Laid-Open Patent Application No. 2001-159499 entitled "TS Bit Rate Conversion Apparatus", before outputting it to the output buffer 105.

In the through process, the ES selection/output unit 103 outputs a received elementary stream to the output buffer 105 without temporarily storing it in the temporary storage buffer 104.

The temporary storage buffer 104 is a memory area for temporarily storing an elementary stream selected from two elementary streams transferred from the input buffers 101 and 102 in the buffer process.

The output buffer 105 is a memory area for storing the elementary stream sent from the ES selection/output unit 103. The output buffer 105 stores sections constituting the elementary stream in sequence in the order it receives, and outputs them on the FIFO basis to an outer device.

The timing information received by the ES selection/output unit 103 may be, for example, information sent from an APC (Automatic Program Controller) mounted in the same broadcasting station, or an ES selection/output trigger input into the data stream selection/output apparatus 1 in real time by the broadcasting station staff. Here the "ES selection/output trigger" is information that allows the data stream selection/output apparatus 1 to switch between elementary streams a predetermined time period after receiving the information. Alternatively, if the data stream selection/output apparatus 1 is used in a local station, the data stream selection/output apparatus 1 may obtain the timing information from a transport stream sent from the key station.

Data Structure

The data structure of the elementary streams as the data broadcasting contents will be described.

Figure 2:
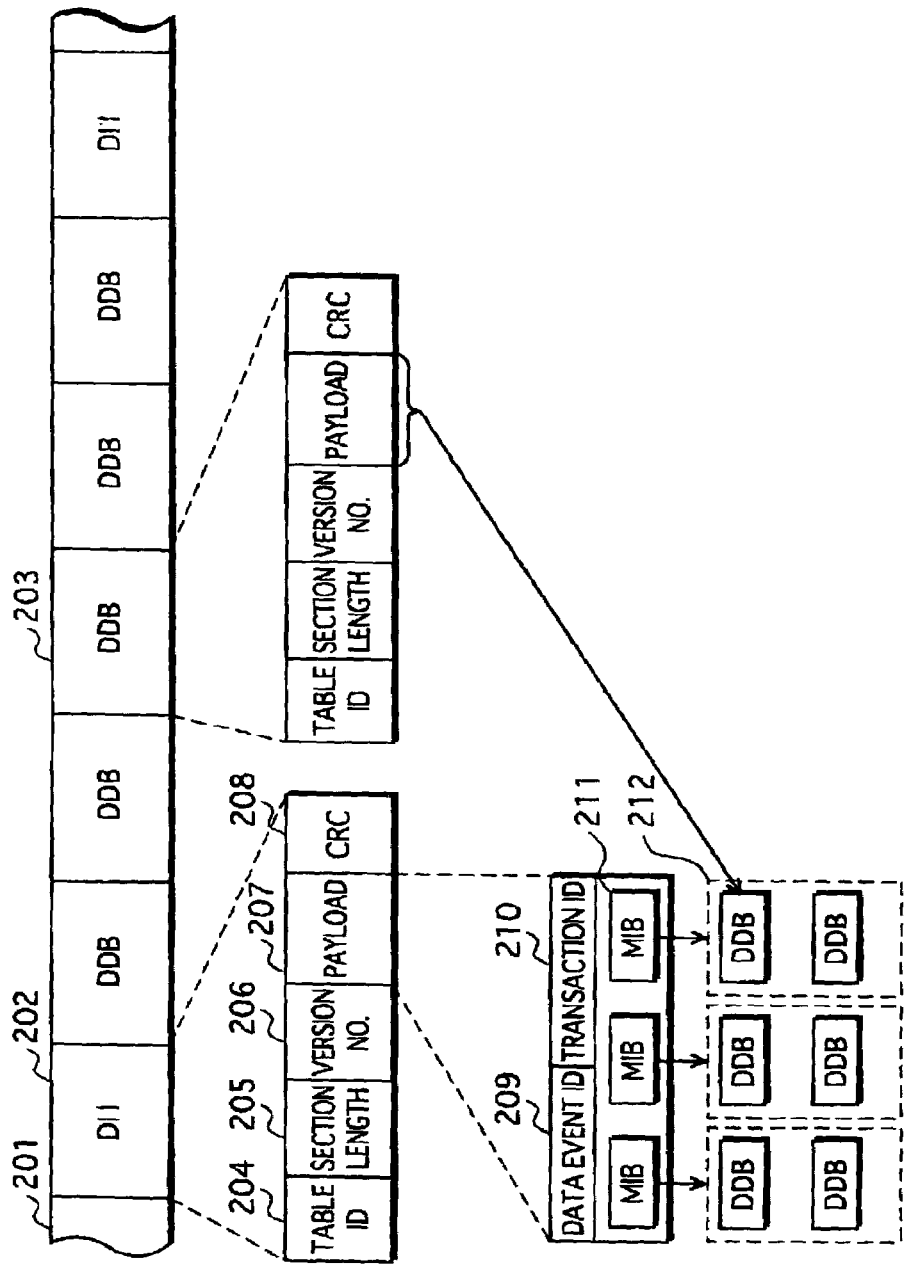
FIG. 2 shows the data structure of the elementary streams as the data broadcasting contents.

FIG. 2 shows the data structure of the elementary streams as the data broadcasting contents.

As shown in FIG. 2, an elementary stream 201 as a data broadcasting content is composed of two types of sections: DII (Download Info Indication) sections 202; and DDB (Download Data Block) sections 203. Each section includes a table ID 204, a section length 205, a version number 206, a payload 207, and a CRC 208. It should be noted here that although not illustrated, each elementary stream is composed of transport stream packets, each of which has a fixed length of 188 bytes.

The table ID 204 is an 8-bit field for identifying a type of the payload data.

The section length 205 is a 12-bit field for indicating a section length. The boundary between sections can be detected from the section length.

The version number 206 is a 5-bit field having a value corresponding to the value in the table ID 204: if the table ID 204 indicates the DII, the version number 206 has a value "0"; and if the table ID 204 indicates the DDB, the version number 206 has lower 5 bits of the module version. The version of the DII is managed by the transaction ID.

The payload 207 in the DII section 202 contains DII, and the payload 207 in the DDB section 202 contains DDB. The DII includes a data event ID 209, a transaction ID 210, and a plurality of MIBs (Module Info Bytes) 211 The data event ID 209 is stored in a 32-bit field called download ID. The version number of the DII is stored in a 32-bit field in the transaction ID 210 in a DSM-CC message header. The MTBs 211 are 8-bit fields each storing a module identifier. The receiving apparatus that receives and reproduces the data broadcasting contents refers to the MIBs 211 to generate modules 212 by arranging DDBs stored in the payload 207 of the DDB section 203.

The CRC 208 is a code used to perform the cyclic redundancy checking.

Operation

Now, the operation of the data stream selection/output apparatus 1 will be described.

Figure 3:
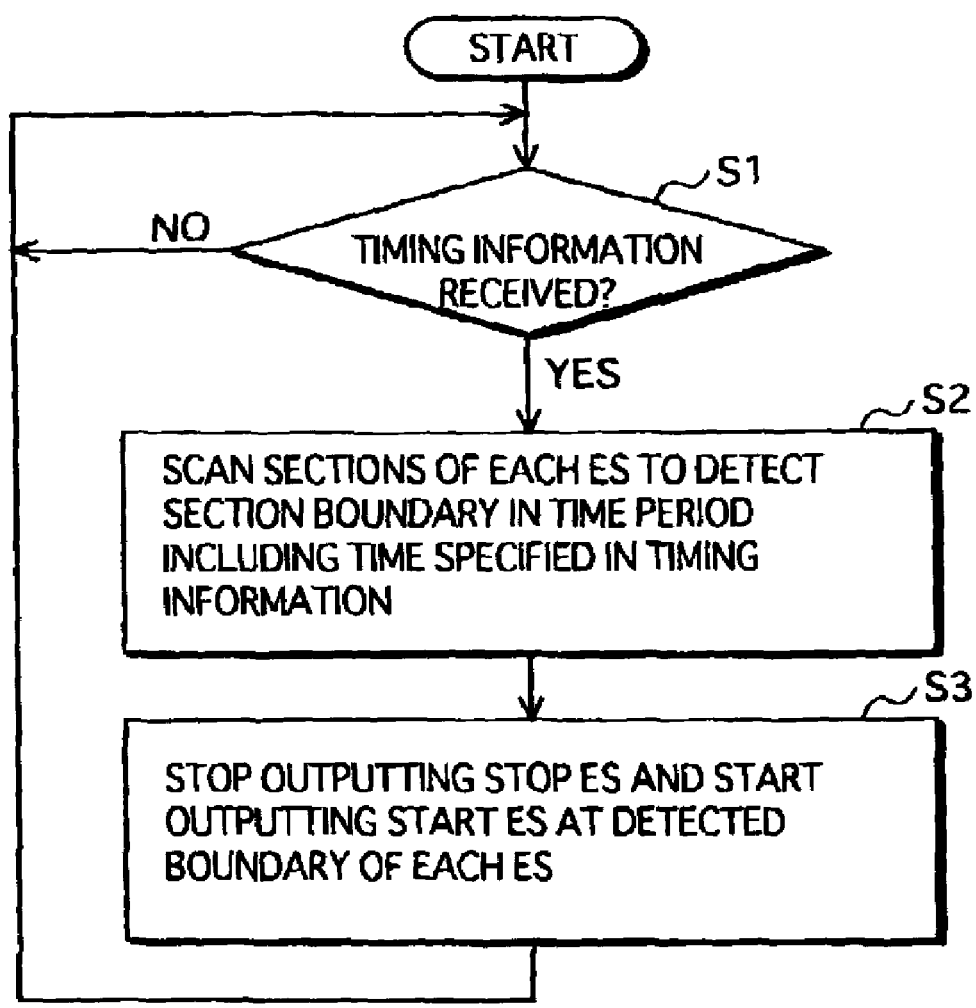
FIG. 3 is a flowchart showing the procedure of the elementary stream selection/output performed by the data stream selection/output apparatus in Embodiment 1.

FIG. 3 is a flowchart showing the procedure of the elementary stream selection/output performed by the data stream selection/output apparatus 1.

If the data stream selection/output apparatus 1 receives the timing information from an outer device (judged as Yes in step S1), the data stream selection/output apparatus 1 scans, in a time period including the time indicated by the timing information, sections of the stop ES and start ES, and detects a boundary between sections for each of the stop ES and start ES by referring to the section length (step S2).

The data stream selection/output apparatus 1 then stops outputting the stop ES at the detected boundary of the stop ES and starts outputting the start ES at the detected boundary of the start ES (step S3). The control then returns to step S1.

Figure 4:
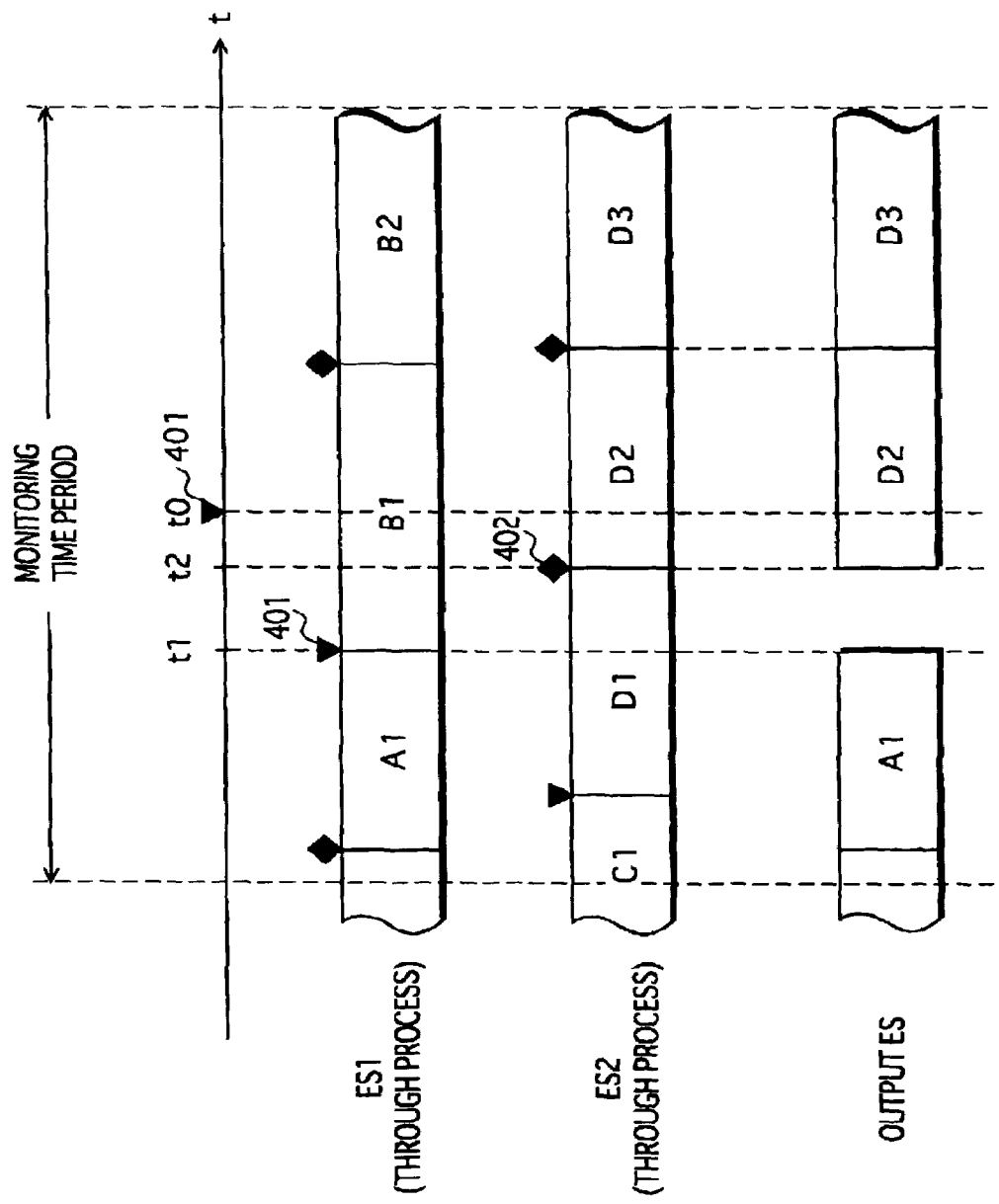
FIG. 4 is a time chart showing how an elementary stream to be output is switched to another.
Figure 5:
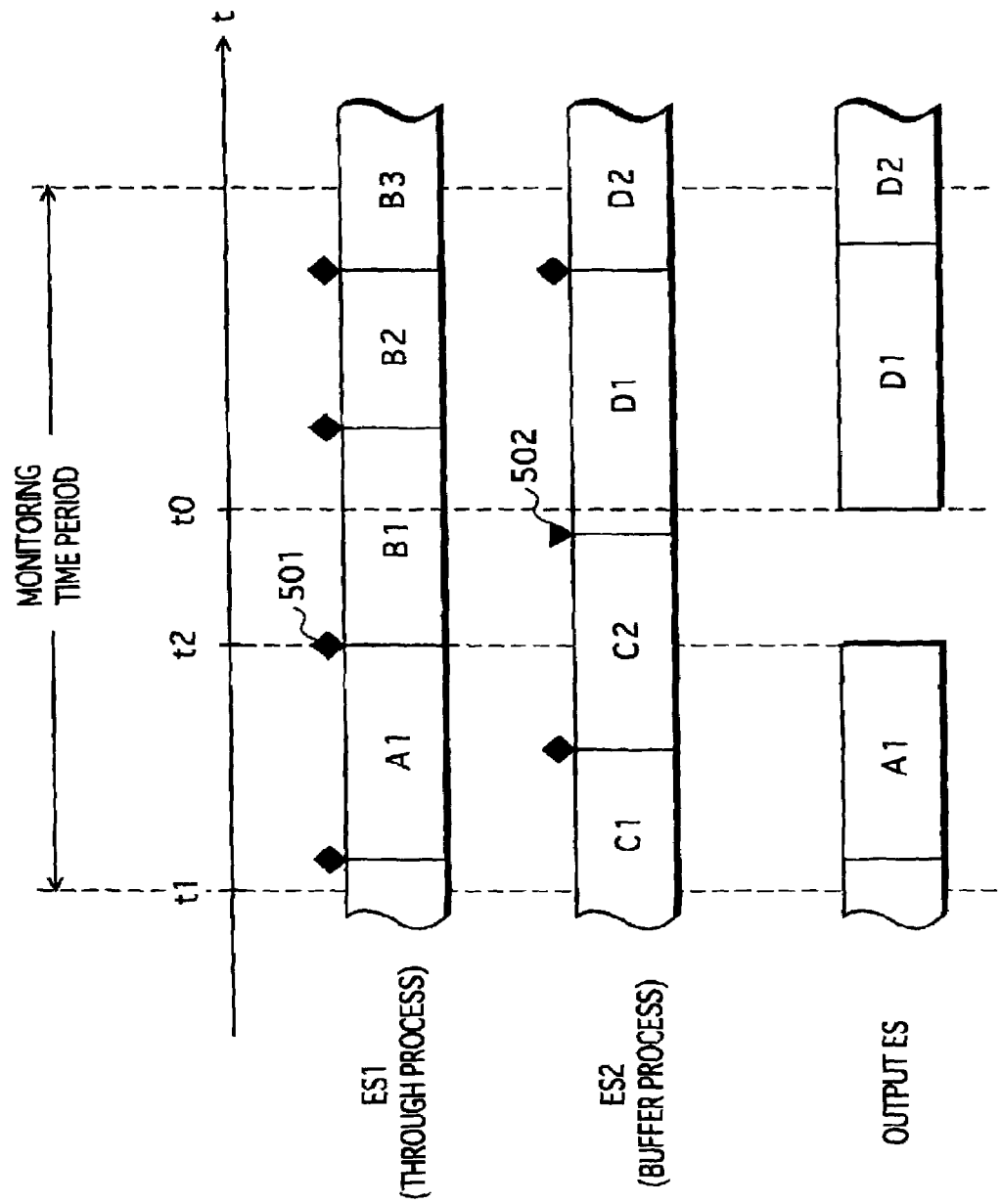
FIG. 5 is a time chart showing how an elementary stream to be output is switched to another.

Now, examples 1 and 2 will be described with reference to FIGS. 4 and 5. FIGS. 4 and 5 are time charts showing how an elementary stream to be output is switched to another. In FIGS. 4 and 5, ES1 is a stop ES, and ES2 is a start ES.

The data stream selection/output apparatus 1, after receiving the timing information indicating a time t0, sets a monitoring time period spanning a certain time period before and after the time t0, and scans ES1 and ES2 in the monitoring time period.

Example 1

In this example 1, both ES1 and ES2 are treated by the through process. ES1 includes sections A1, B1, B2 and others. Of these, the section A1 makes up a broadcast program A, and the sections B1 and B2 makeup a broadcast program B. Each program is identified by a data event ID contained in each section. ES2 includes sections C1, D1, D2, D3 and others. Of these, the section C1 makes up a broadcast program C, and the sections D1, D2, and D3 make up a broadcast program D.

First, the data stream selection/output apparatus 1 reads the section length from the section A1 of ES1 to detect a section boundary 401. The data stream selection/output apparatus 1 then reads the section length from the section D1 of ES2 to detect a section boundary 402.

The data stream selection/output apparatus 1 stops outputting ES1 at time t1 of the section boundary 401, and starts outputting ES2 at time t2 of the section boundary 402.

According to the procedure of example 1, an elementary stream to be output is successfully switched to another in conformity with MPEG.

Example 2

In this example 2, ES1 is treated by the through process, and ES2 is treated by the buffer process. ES2 is stored in the temporary storage buffer 104 at a time t1 when the monitoring time period starts. ES1 includes sections A1, B1, B2, B3 and others. Of these, the section A1 makes up a broadcast program A, and the sections B1, B2, and B3 make up a broadcast program B. ES2 includes sections C1, C2, D1, D2 and others. Of these, the sections C1 and C2 make up a broadcast program C, and the sections D1 and D2 make up a broadcast program D.

First the data stream selection/output apparatus 1 reads the section length from the section A1 of ES1 to detect a section boundary 501. The data stream selection/output apparatus 1 then reads the data event IDs from the sections C2 and D1 of ES2 to detect a broadcast program boundary 502.

The data stream selection/output apparatus 1 stops outputting ES1 at time t2 of the section boundary 501, and starts outputting the section D1 of FS2 stored in the temporary storage buffer 104, at the time t0, starting with the broadcast program boundary 502.

According to the procedure of example 2, an elementary stream to be output is successfully switched to another in conformity with MPEG, and in addition, the broadcast program D starts to be output at the time t0.

Meanwhile, the data stream selection/output apparatus sometimes receives elementary streams after delay. In such a case, conventional TS switchers performs selection/output without considering the delay. When this happens, sections that should not be output are output to receiving apparatuses, which reproduce the received sections, causing unintended displays.

To solve this problem, the data stream selection/output apparatus of the present invention may treat both ES1 (stop ES) and ES2 (start ES) by the buffer process to detect a broadcast program boundary for each of ES1 and ES2. It the data stream selection/output apparatus detects the broadcast program boundary for ES1 earlier than that for ES2, it stops outputting ES1 at the detected broadcast program boundary of ES1 and starts outputting ES2 at the detected broadcast program boundary of ES2.

If the data stream selection/output apparatus detects the broadcast program boundary for ES2 earlier than that for ES1, it stops outputting ES1 at the next broadcast program boundary of ES1 and starts outputting ES2 stored in the buffer starting with the detected broadcast program boundary of ES2.

Embodiment 2

The second embodiment of the data stream selection/output apparatus of the present invention will be described. The data stream selection/output apparatus in Embodiment 2 is basically the same as that in Embodiment 1 except that it deals with a case where the stop and start ESS have sections containing the same data event ID.

Receiving apparatuses receiving data broadcasting programs identify each broadcast program by detecting the data event ID from each section. As a result, for example, if two different broadcast programs are composed of sections containing the same data event ID, the receiving apparatuses recognize the two broadcast programs as the same broadcast program. The data stream selection/output apparatus in Embodiment 2 prevents this problem.

In the following description, only different points from Embodiment 1 will be explained.

The ES selection/output unit 103 scans, in a time period including the time indicated by the timing information, sections of the stop and start ESs, and if it detects the same data event ID in sections of both the stop and start ESs, rewrites the data event ID in the sections of the start ES.

Operation

Now, the operation of the data stream selection/output apparatus in Embodiment 2 will be described.

Figure 6:
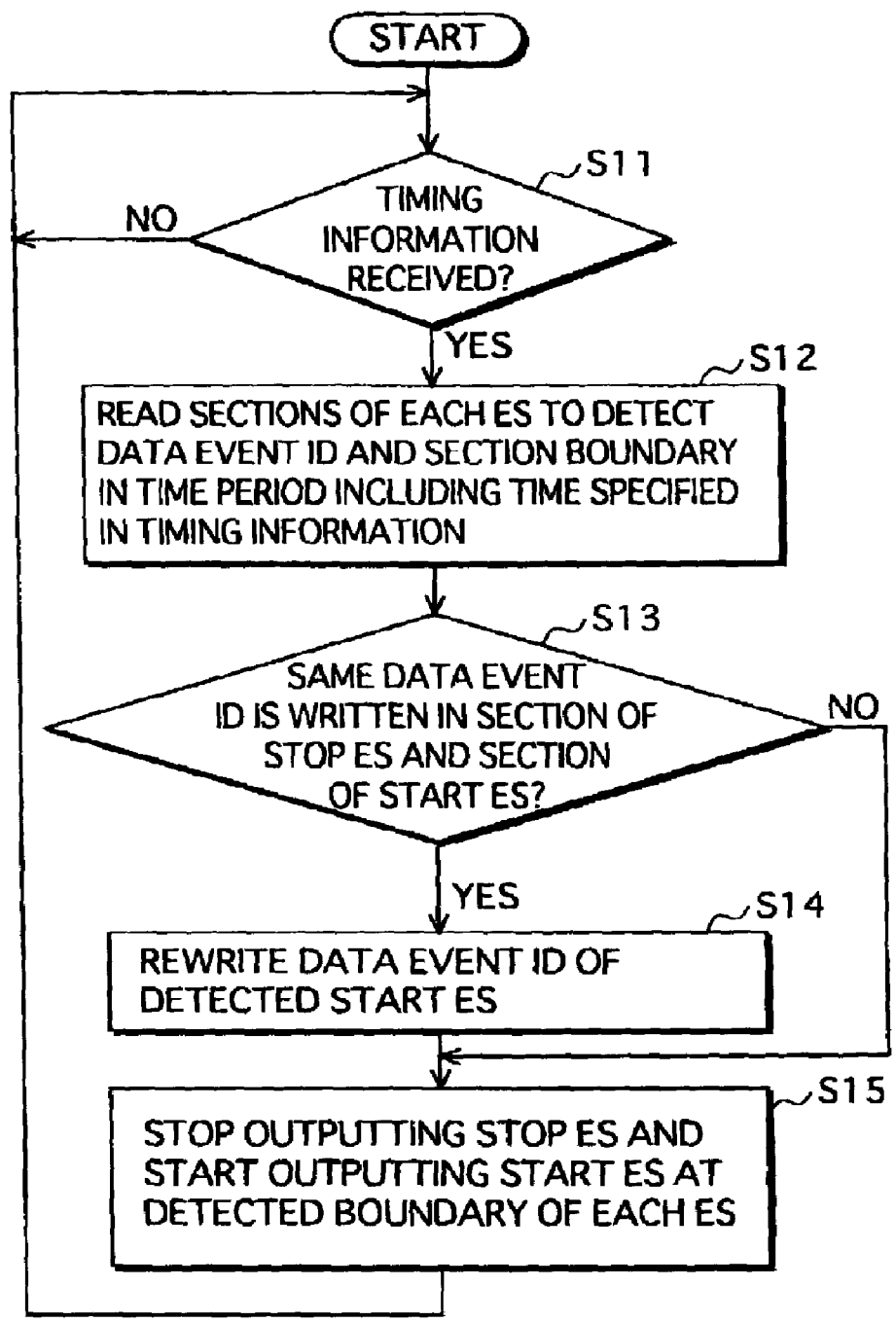
FIG. 6 is a flowchart showing the procedure of the elementary stream selection/output performed by the data stream selection/output apparatus in Embodiment 2.

FIG. 6 is a flowchart showing the procedure of the elementary stream selection/output performed by the data stream selection/output apparatus in Embodiment 2.

If the data stream selection/output apparatus receives the timing information from an outer device (judged as Yes in step S11), the data stream selection/output apparatus scans, in a time period including the time indicated by the timing information, sections of the stop ES and start ES, and detects data event IDs and section boundaries for each of the stop ES and start ES (step S12).

In step S13, the data stream selection/output apparatus judges whether the same data event ID is written in a section of the stop ES and a section of the start ES. If the judgment in step S13 is positive, the control goes to step S14, in which the data event ID in the section of the start ES is rewritten to another one, then the control proceeds to step S15.

If the judgment in step S13 is negative, the control jumps to step S15.

In step S15, the data stream selection/output apparatus stops outputting the stop ES at the detected boundary of the stop ES and starts outputting the start ES at the detected boundary of the start ES. The control then returns to step S11.

With such an operation, the data stream selection/output apparatus outputs elementary streams composed of sections that have data event IDs appropriately indicating broadcast programs.

Embodiment 3

The second embodiment of the data stream selection/output apparatus of the present invention will be described. The data stream selection/output apparatus in Embodiment 3 differs from the data stream selection/output apparatuses in Embodiments 1 and 2 in that it does not scan sections constituting elementary streams, but adds a transport stream packet with a discontinuity indicator (abbreviated as DI) set to "1" to the output elementary stream. The transport stream packet containing a discontinuity indicator set to "1" indicates the discontinuity between data before and after the transport stream packet. With the presence of the transport stream packet containing a discontinuity indicator set to "1", if selection/output of an elementary stream is performed in the middle of a section, the receiving apparatus does not recognize it as a violation of the MPEG standard.

Operation

Now, the operation of the data stream selection/output apparatus in Embodiment 3 will be described.

Figure 7:
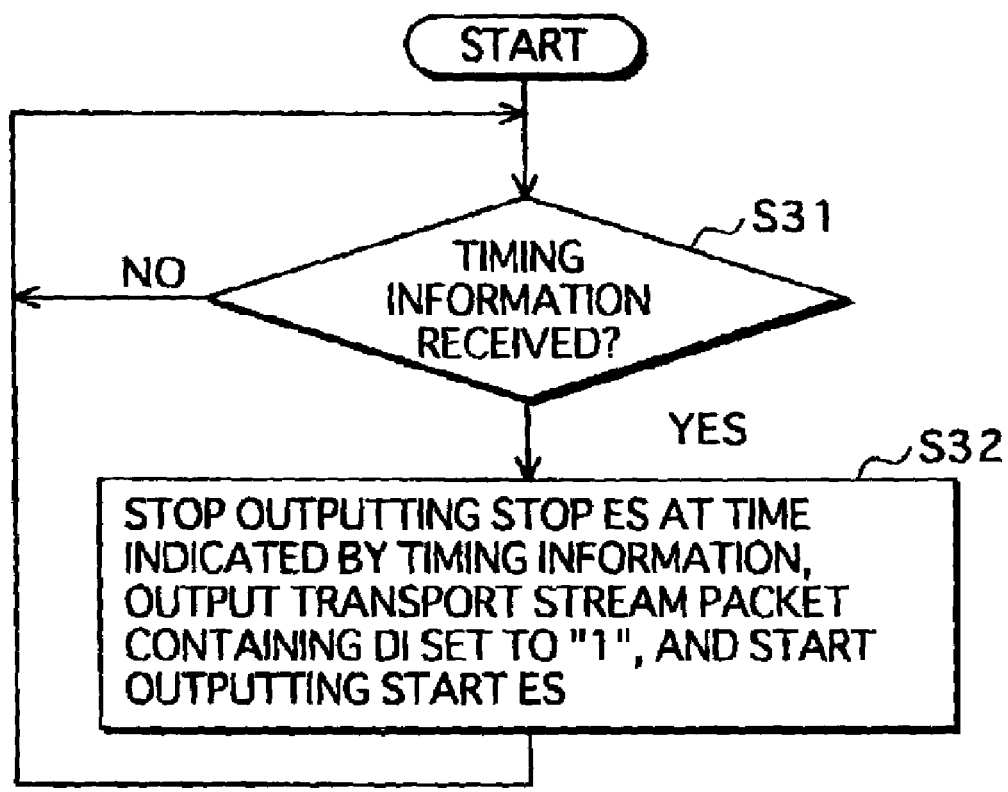
FIG. 7 is a flowchart showing the procedure of the elementary stream selection/output performed by the data stream selection/output apparatus in Embodiment 3.

FIG. 7 is a flowchart showing the procedure of the elementary stream selection/output performed by the data stream selection/output apparatus in Embodiment 3.

If the data stream selection/output apparatus receives the timing information from an outer device (judged as Yes in step S31), the data stream selection/output apparatus stops outputting the stop ES at the time indicated by the timing information, outputs a transport stream packet containing a discontinuity indicator set to "1", and starts outputting the start ES (step S32). The control then returns to step S31.

Here an example will be described with reference to FIG. 8. FIG. 8 is a time chart showing how an elementary stream to be output is switched to another. In FIG. 8, ES1 is a stop ES, and ES2 is a start ES. The boxes in each stream represent transport stream packets. Each section is composed of a plurality of transport stream packets. ES1 includes sections A1, B1, B2 and others. Of these, the section A1 makes up a broadcast program A, and the sections B1 and B2 make up a broadcast program B. ES2 includes sections C1, D1, D2 and others. Of these, the section C1 makes up a broadcast program C, and the sections D1 and D2 make up a broadcast program D.

The data stream selection/output apparatus stops outputting ES1 at time 601 indicated by the timing information, outputs a transport stream packet 602 containing a discontinuity indicator set to "1", and starts outputting ES2.

Supplementary Notes

The present invention, not limited to the above embodiments, includes the following variations.

(1) The data stream selection/output apparatus of the present invention may be composed of a plurality of devices, or may be embedded in to an APC. Also, the present invention can be achieved as a system including a plurality of data stream selection/output apparatuses described in Embodiments 1-3.

(2) In Embodiment 1, the data stream selection/output apparatus detects a section boundary or a broadcast program boundary. However, the data stream selection/output apparatus may detect an updated version number for each of the stop and start elementary streams, and recognize it as a section boundary.

(3) In Embodiment 1, the data stream selection/output apparatus detects a section boundary by referring to the section length. However, the data stream selection/output apparatus may read "payload_unit_start_indicator" having either a value "0" or a value "1" from each transport stream packet constituting the transport streams, detect a transport stream packet containing "payload_unit_start_indicator" having the value "1", and recognize the detected transport stream packet as the section boundary.

(4) In Embodiment 1, when selection/output of an elementary stream is performed, there is a time period during which no elementary stream is output. However, NULL packets or empty carousels may be output during the time period.

(5) In Embodiment 3, the data stream selection/output apparatus starts outputting the start elementary stream immediately after it outputs the transport stream packet 602 with the discontinuity indicator set to "1". However, not limited to this, the data stream selection/output apparatus may, for example, detect a section boundary or a broadcast program boundary of the start elementary stream and start outputting the start elementary stream at the detected boundary, or detect a DII section and start outputting the start elementary stream at the start of the detected DII section.

(6) Embodiment 3, the data stream selection/output apparatus outputs the transport stream packet 602 with the discontinuity indicator set to "1". However, the data stream selection/output apparatus may rewrite the discontinuity indicator to "1" only if the transport stream packet having the discontinuity indicator is to be an output start position of the start elementary stream. This enables the data stream selection/output apparatus to stop outputting the stop elementary stream at the time, and start outputting the start elementary stream starting with the transport stream packet containing the discontinuity indicator rewritten to "1".

(7) The data stream selection/output apparatus of the present invention may include an elementary stream generating unit 1020 and a module buffer 1021, as shown in FIG. 9. The elementary stream generating unit 1020 reads modules from the module buffer 1021 in sequence, divides the read modules into sections, and generates an elementary stream by repeatedly transmitting the sections. With this construction, the data stream selection/output apparatus can switch between elementary streams generated by the elementary stream generating unit 1020 and elementary streams received from outside, and merely switch between elementary streams generated by the elementary stream generating unit 1020.

(8) The present invention may be realized as methods for performing the above-described functions. Also, the present invention may be realized as a computer program for causing a computer to operate by the methods. Also, the present invention may be realized as digital signals representing the computer program.

(9) The present invention may be realized as a computer-readable recording medium (for example, a flexible disk, a hard disk, CD-ROM, MO, DVD, DVD-ROM, DVD-RAM, BD (Blue-ray Disc), or a semiconductor memory) containing the above computer program or digital signals recorded thereon. Also, the present invention may be realized as the computer program or the digital signals recorded on the computer-readable recording medium.

(10) The computer program or the digital signals as the present invention may be transferred via telecommunication lines, radio communications, communication lines, or a network such as the Internet

(11) The present invention may be realized as a computer system including a CPU and a memory, where the memory stores the computer program, and the CPU operates in accordance with the computer program. Also, the computer program or the digital signals as the present invention may be transferred to another computer system by means of the computer-readable recording medium recording them or the network or the like so that the other computer system can operate in the same manner.

(12) The present invention may be any combination of the above embodiments.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data stream selection/output apparatus that selects a data stream out of a plurality of data streams each of which is composed of sequentially obtained data, and outputs the selected data stream, the data stream selection/output apparatus comprising:

a timing information obtaining unit obtaining timing information that indicates a time at which a first data stream being output is switched to a second data stream;

a detecting unit, in a time period including the time indicated by the timing information, scanning the first data stream and the second data stream and detecting a first boundary and a second boundary, the first boundary being an end point of a data block which, among data blocks which exist in the first data stream before the time indicated by the timing information, ends at a position closest to the time indicated by the timing information, the data block conforming to a transmission protocol that is higher than Transport Layer of OSI Reference Model, the second boundary being a start point of a data block that is, among data blocks existing in the second data stream after a time of the first boundary, closest to the time of the first boundary; and a selection/output unit stopping an outputting of the first data stream at the detected first boundary and starting an outputting of the second data stream at the detected second boundary, wherein each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

2. The data stream selection/output apparatus of claim 1, wherein each of the first and second data streams contains a plurality of block groups being groups of data blocks, each of the block groups being a broadcast program composed of a DII and a plurality of DDBs, each boundary between block groups in the second data stream being a second boundary at a start of a broadcasting program, the detecting unit detects, in the time period including the time indicated by the timing information, a start point of a block group that is, among block groups existing in the second data stream after the time of the first boundary, closest to the time of the first boundary, as a boundary between block groups contained in the second data stream, and the selection/output unit stops outputting the first data stream at the first block boundary and starts outputting the second data stream at the block group boundary.

3. The data stream selection/output apparatus of claim 1, wherein
the detecting unit reads a data block length written in each data block constituting the data streams, and detects a data block boundary by referring to the read data block length.

4. The data stream selection/output apparatus of claim 1, wherein
the detecting unit detects a data block boundary by detecting a flag indicating a start of a data block.

5. The data stream selection/output apparatus of claim 1, wherein
the detecting unit detects a flag indicating an update of a data block among data blocks constituting the second data stream, and
the selection/output unit stops outputting the first data stream at the detected first block boundary and starts outputting the second data stream from the data block whose update is indicated by the detected flag.

6. The data stream selection/output apparatus of claim 1, wherein
the timing information obtaining unit obtains the timing information from an external apparatus.

7. The data stream selection/output apparatus of claim 2, wherein
each boundary between block groups in the first data stream being a first boundary at an end of a broadcast program,
the detecting unit detects, in the time period including the time indicated by the timing information, an end point of a block group which, among block groups which exist in the first data stream before the time indicated by the timing information, ends at a position closest to the time indicated by the timing information, as a boundary between block groups contained in the first data stream, and
the selection/output unit stops outputting the first data stream at the block group boundary of the first data stream and starts outputting the second data stream at the block group boundary of the second data stream.

8. The data stream selection/output apparatus of claim 2 further comprising
a rewriting unit for judging whether the same block group identifier is written in the first data stream data block and the second data stream data block and if a result of the judgment is positive, rewriting the block group identifier in the data block of the second data stream to another code.

9. The data stream selection/output apparatus of claim 2 further comprising
a data stream generating unit for generating the first data stream or the second data stream.

10. The data stream selection/output apparatus of claim 2, wherein
the timing information obtaining unit obtains the timing information from composition information that is contained in the data streams and indicates a composition of block groups contained in the data streams.

11. The data stream selection/output apparatus of claim 7, wherein
the detecting unit reads block group identifiers in sequence from data blocks, and if the detecting unit reads a block group that is different from a block group identifier immediately before, the detecting unit recognizes a boundary between data blocks respectively containing the two block group identifiers, as a block group boundary.

12. A computer readable medium storing a control program that causes an apparatus with a CPU to perform a data stream selection/output process in which a data stream is selected out of a plurality of data streams each of which is composed of sequentially obtained data, and the selected data stream is output, the data stream selection/output process comprising:
a timing information obtaining step obtaining timing information that indicates a time at which a first data stream being output is switched to a second data stream;
a detecting step for, in a time period including the time indicated by the timing information, scanning the first data stream and the second data stream and detecting a first boundary and a second boundary, the first boundary being an end point of a data block which, among data blocks which exist in the first data stream before the time indicated by the timing information, ends at a position closest to the time indicated by the timing information, the data block conforming to a transmission protocol that is higher than Transport Layer of OSI Reference Model, the second boundary being a start point of a data block that is, among data blocks existing in the second data stream after a time of the first boundary, closest to the time of the first boundary; and
a selection/output step for stopping outputting the first data stream at the detected first boundary and starting an outputting of the second data stream at the detected second boundary, wherein
each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

13. A computer readable recording medium in which a control program is recorded, the control program causing an apparatus with a CPU to perform a data stream selection/output process in which a data stream is selected out of a plurality of data streams each of which is composed of sequentially obtained data, and the selected data stream is output, the data stream selection/output process comprising:
a timing information obtaining step for obtaining timing information that indicates a time at which a first data stream being output is switched to a second data stream;
a detecting step for, in a time period including the time indicated by the timing information, scanning the first data stream and the second data stream and detecting a first boundary and a second boundary, the first boundary being an end point of a data block which, among data blocks which exist in the first data stream before the time indicated by the timing information, ends at a position closest to the time indicated by the timing information, the data block conforming to a transmission protocol that is higher than Transport Layer of OSI Reference Model, the second boundary being a start point of a data block that is, among data blocks existing in the second data stream after a time of the first boundary, closest to the time of the first boundary; and
a selection/output step for stopping outputting the first data stream at the detected first boundary and starting an outputting of the second data stream at the detected second boundary, wherein
each data stream is generated in accordance with a DSM-CC protocol, each data block is either DII or DDB, each of the DII and DDB being defined by the DSM-CC protocol as a section being a unit of data that is repeatedly, and each data block includes, at an end thereof, check data used for checking whether or not the each data block is valid.

14. A data stream selection/output method that selects a data stream out of a plurality of data streams each of which is composed of sequentially obtained data, and outputs the selected data stream, the data stream selection/output method comprising:
a timing information obtaining step for obtaining timing information that indicates a time at which a first data stream being output is switched to a second data stream;
a detecting step for, in a time period including the time indicated by the timing information, scanning the first data stream and the second data stream and detecting a first boundary and a second boundary, the first boundary being an end point of a data block which, among data blocks which exist in the first data stream before the time indicated by the timing information, ends at a position closest to the time indicated by the timing information, the data block conforming to a transmission protocol that is higher than Transport Layer of OSI Reference Model, the second boundary being a start point of a data block that is, among data blocks existing in the second data stream after a time of the first boundary, closest to the time of the first boundary; and
a selection/output step for stopping outputting the first data stream at the first boundary and starting an outputting of the second data stream at the second boundary, wherein
each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

15. A data stream selection/output apparatus that selects a data stream out of a plurality of data streams each of which is composed of sequentially obtained data, and outputs the selected data stream, the data stream selection/output apparatus comprising:
a timing information obtaining unit obtaining timing information that indicates a time at which a first data stream being output is switched to a second data stream;
a detecting unit, in a time period including the time indicated by the timing information, scanning the second data stream to detect, as a boundary between data blocks of the second data stream, a start point of a data block that is, among data blocks existing in the second data stream after a time at which an outputting of the first data stream ends, closest to the time at which the outputting of the first data stream ends, where the data blocks conform to a transmission protocol that is higher than Transport Layer of OSI Reference Model; and
a selection/output unit stopping an outputting of the first data stream in the time period including the time indicated by the timing information, then outputting discontinuity information that indicates a discontinuity between data streams, and then starting an outputting of the second data stream at the detected block boundary, wherein
each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

16. The data stream selection/output apparatus of claim 15, wherein
each of the first and second data streams contains a plurality of block groups being groups of data blocks,
the detecting unit detects, in the time period including the time indicated by the timing information, a boundary between block groups contained in the second data stream, and
the selection/output unit stops outputting the first data stream in the time period including the time indicated by the timing information, then outputs the discontinuity information, and then starts outputting the second data stream at the detected block group boundary.

17. The data stream selection/output apparatus of claim 16, wherein
the data streams are transport streams containing discontinuity indicators, and the discontinuity information is a discontinuity indicator that has been set to "1."

18. A data stream selection/output apparatus that selects a data stream out of a plurality of data streams each of which is composed of sequentially obtained data, and outputs the selected data stream, the data stream selection/output apparatus comprising:
a timing information obtaining unit obtaining timing information that indicates a time at which a first data stream being output is switched to a second data stream;
a detecting unit, in a time period including the time indicated by the timing information, scanning the second data stream to detect, as a boundary between data blocks of the second data stream, a start point of a data block that is, among data blocks existing in the second data stream after a time at which an outputting of the first data stream ends, closest to the time at which the outputting of the first data stream ends, where the data blocks conform to a transmission protocol that is higher than Transport Layer of OSI Reference Model;
an attaching unit attaching discontinuity information that indicates a discontinuity between data streams; and
a selection/output unit stopping an outputting of the first data stream in the time period including the time indicated by the timing information, and then starting an outputting of the second data stream, to which the discontinuity information has been attached by the attaching unit, at the detected block boundary, wherein
each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

19. The data stream selection/output apparatus of claim 18, wherein
the data streams are transport streams containing discontinuity indicators, and
the discontinuity information is a discontinuity indicator that has been set to "1."

20. A computer readable medium storing a control program that causes an apparatus with a CPU to perform a data stream selection/output process in which a data stream is selected out of a plurality of data streams each of which is composed of sequentially obtained data, and the selected data stream is output, the data stream selection/output process comprising:

a timing information obtaining step for obtaining timing information that indicates a time at which a first data stream being output is switched to a second data stream;

a detecting step for, in a time period including the time indicated by the timing information, scanning the second data stream to detect, as a boundary between data blocks of the second data stream, a start point of a data block that is, among data blocks existing in the second data stream after a time at which an outputting of the first data stream ends, closest to the time at which the outputting of the first data stream ends, where the data blocks conform to a transmission protocol that is higher than Transport Layer of OSI Reference Model; and a selection/output step for stopping an outputting of the first data stream in the time period including the time indicated by the timing information, then outputting discontinuity information that indicates a discontinuity between data streams, and then starting to output the second data stream at the detected block boundary, wherein each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

21. A computer-readable recording medium in which a control program is recorded, the control program causing an apparatus with a CPU to perform a data stream selection/output process in which a data stream is selected out of a plurality of data streams each of which is composed of sequentially obtained data, and the selected data stream is output, the data stream selection/output process comprising:

a timing information obtaining step for obtaining timing information that indicates a time at which a first data stream being output is switched to a second data stream;

a detecting step for, in a time period including the time indicated by the timing information, scanning the second data stream to detect, as a boundary between data blocks of the second data stream, a start point of a data block that is, among data blocks existing in the second data stream after a time at which an outputting of the first data stream ends, closest to the time at which the outputting of the first data stream ends, where the data blocks conform to a transmission protocol that is higher than Transport Layer of OSI Reference Model; and a selection/output step for stopping outputting the first data stream in the time period including the time indicated by the timing information, then outputting discontinuity information that indicates a discontinuity between data streams, and then starting to output the second data stream at the detected block boundary, wherein each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

22. A data stream selection/output method that selects a data stream out of a plurality of data streams each of which is composed of sequentially obtained data, and outputs the selected data stream, the data stream selection/output method comprising:

a timing information obtaining step for obtaining timing information that indicates a time at which a first data stream being output is switched to a second data stream;

a detecting step for, in a time period including the time indicated by the timing information, scanning the second data stream to detect, as a boundary between data blocks of the second data stream, a start point of a data block that is, among data blocks existing in the second data stream after a time at which an outputting of the first data stream ends, closest to the time at which the outputting of the first data stream ends, where the data blocks conform to a transmission protocol that is higher than Transport Layer of OSI Reference Model; and a selection/output step for stopping outputting the first data stream in the time period including the time indicated by the timing information, then outputting discontinuity information that indicates a discontinuity between data streams, and then starting to output the second data stream at the detected block boundary, wherein each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

23. A data stream selection/output apparatus that selects a data stream out of a plurality of data streams each of which is composed of sequentially obtained data compliant with an MPEG standard, and outputs the selected data stream, the data stream selection/output apparatus comprising:

a first input buffer for buffering a first data stream from the plurality of data streams;

a second input buffer for buffering a second data stream from the plurality of data streams;

a timing information obtaining unit for obtaining timing information that indicates a time at which a first data stream being output is to be switched to a second data stream;

a detecting unit, during a monitoring time period including a first time period including and extending beyond the time indicated by the timing information, scanning the first data stream in the first input buffer and the second data stream in the second input buffer to detect a first boundary and a second boundary, the first boundary being an end point of a data block which among data blocks which exist in the first data stream before the time indicated by the timing information, ends at a position closest to the time indicated by the timing information, the data block conforming to a transmission protocol that is higher than Transport Layer of OSI Reference Model, the second boundary being a start point of a data block that is, among data blocks existing in the second data stream after a time of the first boundary, closest to the time of the first boundary; and a selection/output unit stopping an outputting the first data stream at the detected first boundary and starting an outputting the second data stream at the detected second boundary, wherein each data stream is generated in accordance with a DSM-CC protocol, each data block is either DII or DDB, each of the DII and DDB being defined by the DSM-CC protocol as a section being a unit of data that is repeatedly transmitted, and each data block includes, at an end thereof, check data used for checking whether or not the each data block is valid.

24. The data stream selection/output apparatus of claim 23, wherein
the first and second data streams are data streams generated in conformity with DSM-CC protocols, and the data blocks are sections defined in the DSM-CC protocols.

25. The data stream selection/output apparatus of claim 23, wherein
the detecting unit reads a data block length written in each data block constituting the data streams, and detects a data block boundary by referring to the read data block length.

26. The data stream selection/output apparatus of claim 24, wherein
each of the first and second data streams contains a plurality of block groups being groups of data blocks,
the detecting unit detects, in the monitoring time period including the time indicated by the timing information, a boundary between block groups contained in the second data stream, and
the selection/output unit stops outputting the first data stream at the first block boundary and starts outputting the second data stream at the block group boundary.

27. The data stream selection/output apparatus of claim 26 further comprising
a rewriting unit operable to judge whether the same block group identifier is written in a first data stream data block and the second data stream data block and if a result of the judgment is positive, rewriting the block group identifier in the data block of the second data stream to a different code.

28. The data stream selection/output apparatus of claim 26, wherein
the detecting unit, in the monitoring time period including the time indicated by the timing information, scans the first data stream and detects a boundary between block groups contained in the first data stream, and
the selection/output unit stops outputting the first data stream at the block group boundary of the first data stream and starts outputting the second data stream at the block group boundary of the second data stream.

29. The data stream selection/output apparatus of claim 28, wherein
the detecting unit reads block group identifiers in sequence from data blocks, and if the detecting unit reads a block group that is different from a block group identifier immediately before, the detecting unit recognizes a boundary between data blocks respectively containing the two block group identifiers, as a block group boundary.

30. The data stream selection/output apparatus of claim 29, wherein
the monitoring time period includes a second time period before the time indicated by the timing information.

31. A data stream selection/output apparatus that selects a data stream out of a plurality of data streams each of which is composed of a sequentially obtained data, and outputs the selected data stream, the data stream selection/output apparatus comprising:
a timing information obtaining unit obtaining timing information that indicates a time at which a first data stream being output is switched to a second data stream;
a detecting unit, in a time period including the time indicated by the timing information, scanning the first data stream and the second data stream and detecting a first boundary and a second boundary, the first boundary being an end point of a block group which, among block groups which exist in the first data stream before the time indicated by the timing information, ends at a position closest to the time indicated by the timing information, each block group being a group of data blocks conforming to a transmission protocol that is higher than Transport Layer of OSI Reference Model, the second boundary being a start point of a block group that is, among block groups existing in the second data stream after a time of the first boundary, closest to the time of the first boundary; and
a selection/output unit stopping an outputting of the first data stream at the detected first boundary and starting an outputting of the second data stream at the detected second boundary, wherein
each data stream is generated in accordance with a DSM-CC protocol, each data block is either DII or DDB, each of the DII and DDB being defined by the DSM-CC protocol as a section being a unit of data that is repeatedly transmitted, each data block includes, at an end thereof, check data used for checking whether or not the each data block is valid, and each block group includes a DII and a plurality of DDBs that are managed by the DII.

* * * * *

UNITED STATES PATENT AND TRADEMARK OFFICE
CERTIFICATE OF CORRECTION

| | | |
|---|---|---|
| PATENT NO. | : 7,596,624 B2 | Page 1 of 1 |
| APPLICATION NO. | : 10/278118 | |
| DATED | : September 29, 2009 | |
| INVENTOR(S) | : Terada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1311 days.

Signed and Sealed this

Twenty-eighth Day of September, 2010

David J. Kappos
*Director of the United States Patent and Trademark Office*